United States Patent Office 3,477,342
Patented Nov. 11, 1969

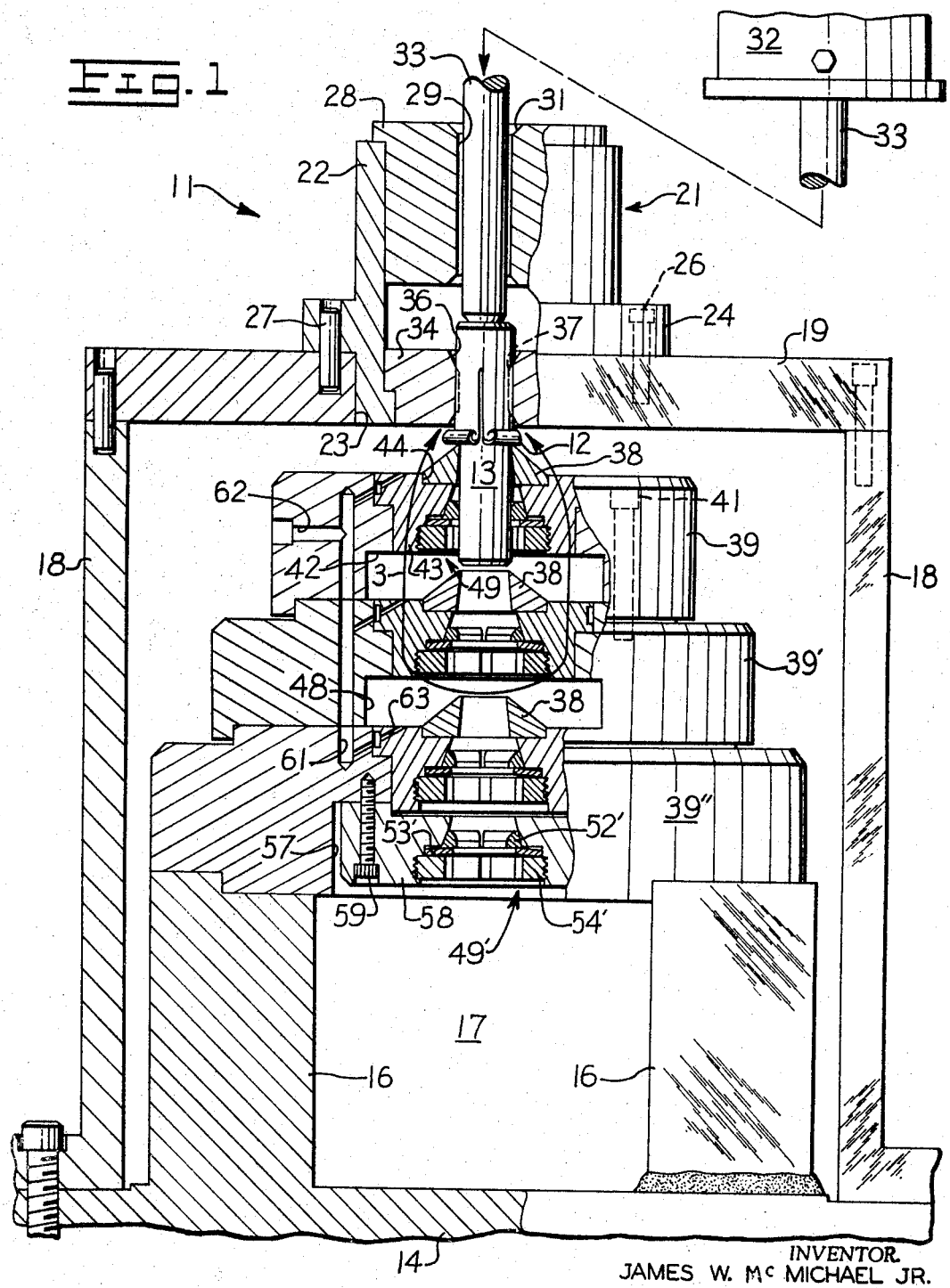

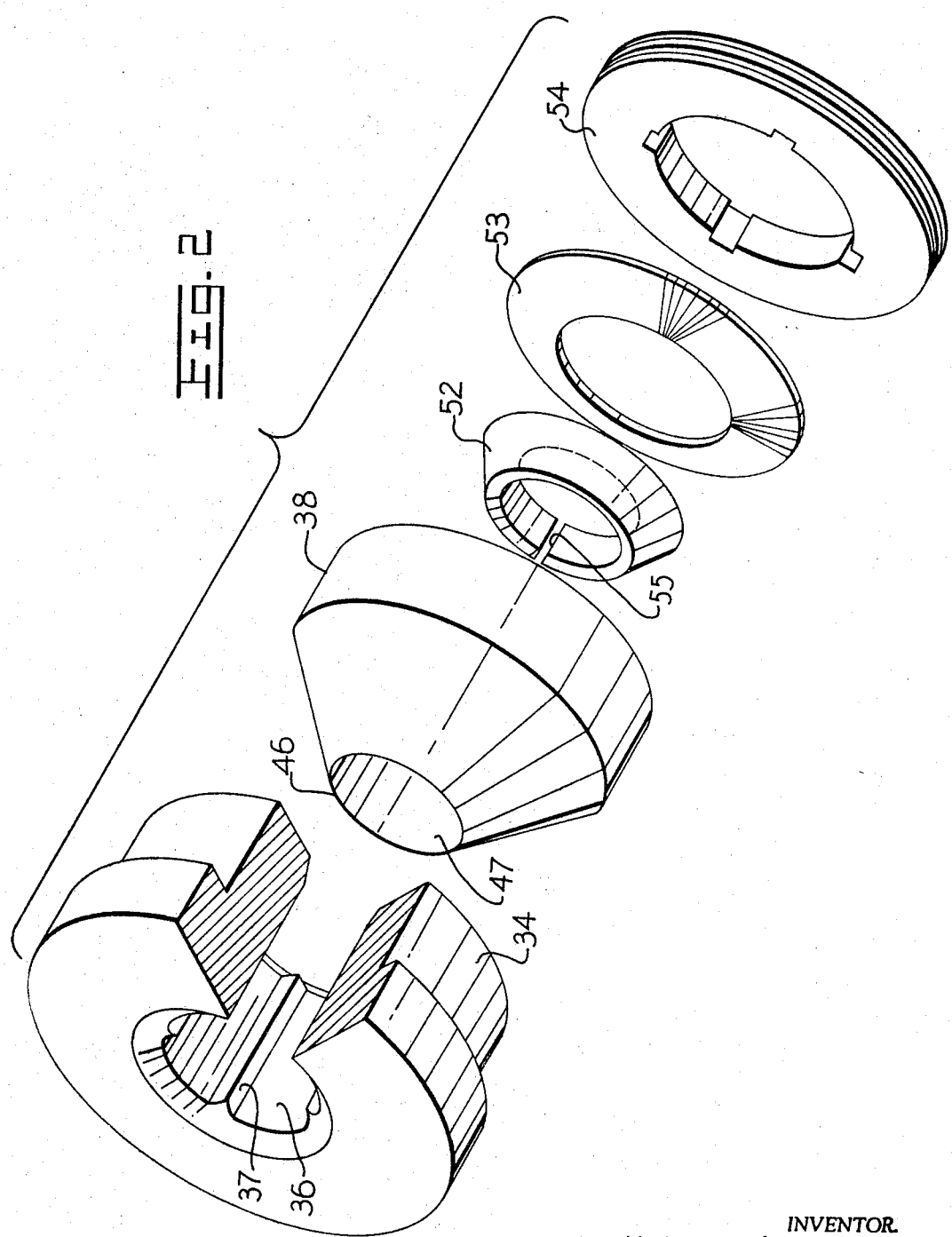

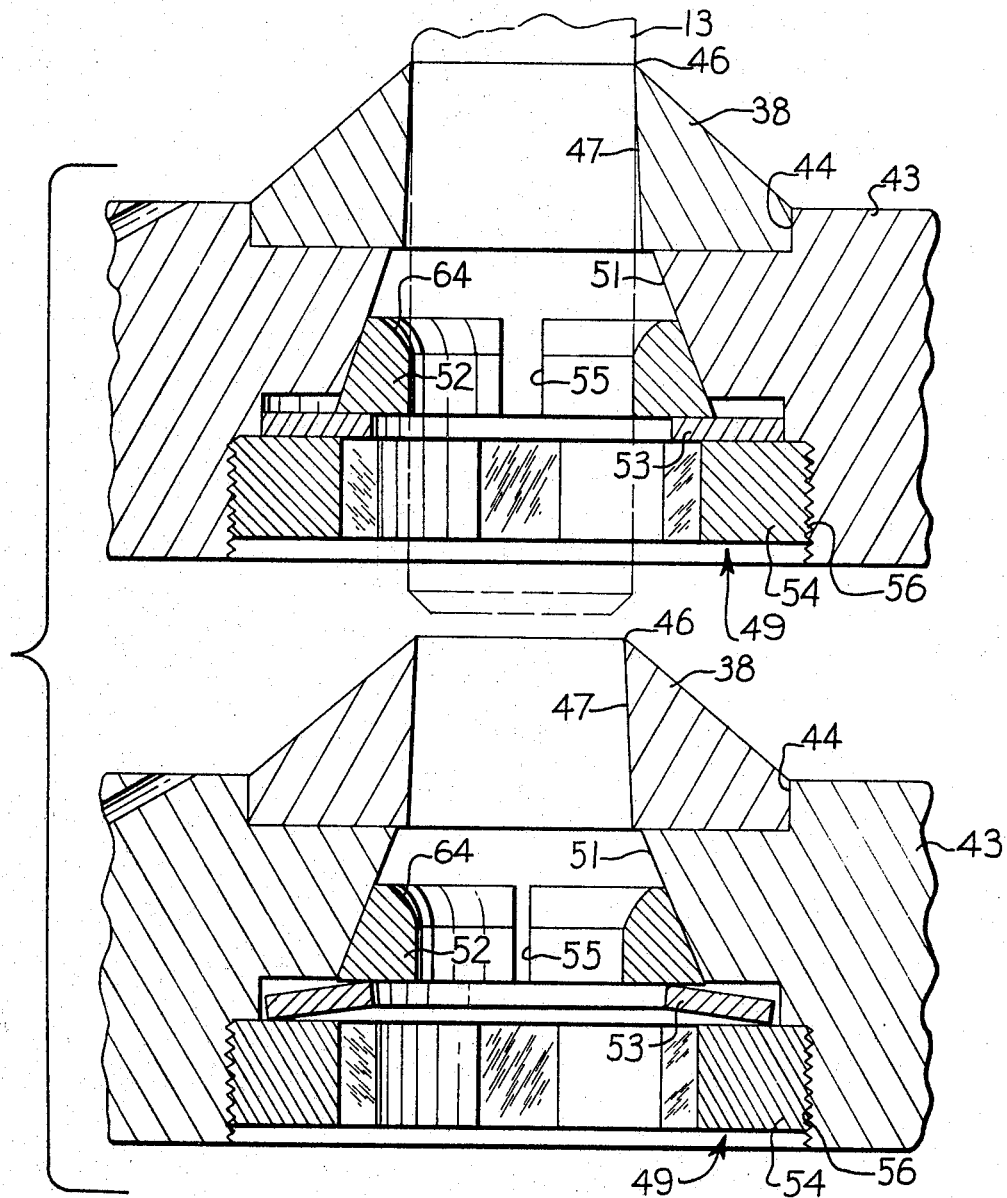

1

3,477,342
PIN PEELER
James W. McMichael, Jr., Peoria, Ill., assignor to Caterpillar Tractor Co., Peoria, Ill., a corporation of Illinois
Filed Oct. 19, 1967, Ser. No. 676,578
Int. Cl. B23d 1/00, 3/00, 5/00
U.S. Cl. 90—24         2 Claims

ABSTRACT OF THE DISCLOSURE

A surface layer of material is shaved from metal stock of round cross-section by driving the stock through a series of spaced coaxial annular cutting edges of progressively diminishing diameter. Accurate positioning of the work stock is maintained by a series of resilient guide rings which seat in tapered bores in fixed guide ring holders. A spring exerts an axial force on each guide ring whereby a centering force acts on the stock.

BACKGROUND OF THE INVENTION

This invention relates to metal working and related arts and more particularly to apparatus for shaving a superficial layer of material from metal rods or the like.

In the production of linear metal stock, and in the fabrication of machine parts therefrom, it may be necessary to remove a surface layer of the stock. This may be necessary to reduce the stock to a desired diameter or shape or to remove superficial material which lacks the desired metallugrical characteristics or for both reasons. Hot rolled steel rod, for example, has a surface layer of decarburized steel which cannot readily be hardened by conventional processing. Conventional methods for removing surface material from the stock include grinding or turning on a lathe. Both of these methods are slow, expensive and require complex equipment, particularly where high volume processing is called for.

To provide for faster and more efficient operation with less complex equipment, techniques have been developed for drawing rod stock through an annular cutting edge which shaves or peels the surface layer from the material. Several serious problems have been encountered in connection with these techniques as heretofore practiced. Notably, it has proved difficult to maintain the work stock in a centered position relative to the annular cutting edge.

Unlike a conventional reducing die in wire drawing equipment, which exerts forces on the work stock automatically tending to maintain a centered relationship, an annular cutting edge has no inherent work stabilizing effect. The cutting edge may in fact create forces which tend to produce misalignment of the work stock. Still further inefficiencies have resulted from the practice of drawing the work stock through the cutting eelment in that an end portion of the stock must be utilized for gripping the material and is discarded after the shaving operation. Where short parts are being produced this wasted end portion may be a serious adverse cost factor. Still other difficulties have been encountered with respect to lubricating and cooling the stock in passage through the cutting edges.

The lack of efficient means for removing a surface layer from rod stock has in some instances resulted in indirect cost complications in connection with the fabrication of various machine parts. In the production of the precision, hardened hinge pins which are used to join successive links of the track chain of a crawler vehicle, for example, it has been customary to use costly cold rolled steel as the raw material. Hot rolled steel is less expensive but is characterized by a decarburized surface layer which must be removed prior to a hardening treatment. The cost of grinding or turning this layer from the stock by conventional

2 means has outweighed the cost advantages of hot rolled steel as a starting material.

SUMMARY OF THE INVENTION

The present invention provides an efficient and simple apparatus for shaving a surface layer of material from metal rods or the like in which a resilient mechanical guide means applies a centering force to maintain a preferred relationship between the stock and an annular cutting edge. In a preferred form the invention further provides for a staged shaving of the stock by multiple cutting edges to reduce lubrication and cooling problems and further provides for reduced wastage by driving, rather than pulling, the stock through the cutting edges.

Accordingly, it is an object of this invention to facilitate the removal of surface material from rod shaped metal stock or the like. It is a further object of the invention to reduce the cost of fabricating rod shaped metal parts.

The invention will best be understood by reference to the following description of a preferred embodiment in conjunction with the accompanying drawings.

BRIEF DESCRIPTION OF THE DRAWINGS

In the accompanying drawings:

FIGURE 1 is a cutaway elevation view, partially in section, of a device for peeling a superficial layer of material from rod stock in accordance with the invention;

FIGURE 2 is an exploded perspective view of a cutting edge and associated guide means and centering force producing elements of the device of FIGURE 1; and FIGURE 3 is an enlarged view of the area of FIGURE 1 encircled by line 3 thereof, better illustrating the action of the work stock centering elements associated with the cutting edges thereof.

DESCRIPTION OF A PREFERRED EMBODIMENT

Referring now to the drawing and more particularly to FIGURE 1 thereof, there is shown an apparatus 11 for peeling a surface layer of material 12 from short sections of rod stock 13 in accordance with the invention. The sections of stock 13 in this example are to be track pins which are used to couple successive links of the track chain in a crawler vehicle and may typically be about 1½ inches in diameter and 7 inches long, it being understood that the invention is equally applicable to the processing of rod-like and tubular materials of various dimensions and for various purposes. However, it is of interest in this example that it has heretofore been practice to use relatively expensive cold rolled stock for the manufacture of track pins, since a precision hardened surface is needed on such elements and there has not heretofore been a convenient means for removing the decarburized surface layer 12 which is found on the less expensive hot rolled stock. The present invention makes it feasible to utilize hot rolled stock for this purpose inasmuch as the cost of a subsequent finish grinding and hardening treamtent is offset by the reduced cost of the hot rolled stock itself.

The pin peeler apparatus 11 may have a base plate 14 beneath a pair of rectangular support blocks 16 which are spaced apart to provide a space 17 for receiving the peeled pins 13 after passage through the cutting elements of the apparatus. A side frame member 18 extends upwardly from base plate 14 adjacent each block 16 and on the opposite side thereof from space 17, the side frame members being spanned at the top by a cross frame member 19 situated a substantial distance above the blocks. A stock entry guide assembly 21 is secured to the frame cross member 19 at the center thereof above the receiving space 17 between blocks 16.

Stock entry guide assembly 21 is comprised of a sleeve 22 having a lower end received in a conforming bore 23 in frame cross member 19 and having a flange 24 which seats against the upper surface thereof and is secured thereto by suitable means such as bolts 26 and dowel pins 27. The initial guidance of stock entering the pin peeler is provided for by an annular first guide 28 disposed coaxially within the upper end of sleeve 22 and having an axial passage 29 with flaring ends 31 through which the stock 13 is passed. The first entry guide 28 functions to provide only rough positioning of the stock 13, and accordingly, passage 29 is dimensioned to provide for a relatively loose fit of the stock 13 therein.

Where short links of stock 13 are being processed, as in this example, it is very advantageous to push or drive the stock through the peeling apparatus rather than pulling the stock therethrough. The driving of the stock 13 through the peeler 11 may be effected by means of a hydraulic ram 32 or the like having a reciprocable rod 33 with a diameter slightly less than that of the stock 13 so that the rod 33 may be driven into the passage 29 of the entry guide and through the additional work passages to be hereinafter described to force the stock therethrough. An important advantage of driving the stock 13 as opposed to pulling the stock is that it is unnecessary to utilize an end portion of the stock for gripping the material.

More precise initial positioning of the stock 13 is provided for by a second annular guide 34 disposed coaxially within the lower end of sleeve 22 and having an axial passage 36 with flared ends through which the stock passes after passage through the first guide 28. The axial passage 36 of the second guide is dimensioned to conform closely to the initial diameter of the stock 13 in order to initially center the stock exactly along the axis of the system. The second guide 34 serves the further purpose of scoring the stock 13 along the sides thereof to facilitate removal of the surface material 12. For this purpose four longitudinally aligned knife edges 37 are situated within passage 36 at 90° angles around the axis thereof as best illustrated in FIGURE 2.

Referring now again to FIGURE 1, the peeling of the stock 13 is accomplished in several stages by spaced apart coaxial annular cutting dies 38 having cutting edges of progressively reduced diameter. Three such dies 38 are employed in this example, it being understood that a greater or lesser number may be utilized according to the depth of cut desired and other factors. Each of the dies 38 is mounted in a separate annular die and guide cartridge 39 situated between the support blocks 16 and the cross frame member 19. The three cartridges 39 are of progressively larger outside diameter from top to bottom and are disposed coaxially with respect to each other. Each of the top two cartridges 39 is secured to the next lowermost cartridge by suitable means such as bolts 41 with the lowermost cartridge being secured to blocks 16.

The uppermost cartridge 39 has an inwardly directed lip 42 against which a flanged annular holder 43 seats in coaxial relationship therewith. Referring now to FIGURE 3 in conjunction with FIGURE 1, the uppermost die 38 is seated in a shallow annular recess 44 in the upper surface of holder 43. Die 38 has an annular cutting edge 46 at the upper end which is of an inside diameter slightly less than that of the unpeeled stock 13 whereby a superficial layer of material 12 is cut from the stock as it is forced through the die. To facilitate the cutting action, the axial passage 47 through the die is of progressively increasing diameter in a direction downward from the cutting edge 46, the slope of the wall of the passage relative to the axis of the system typically being ½° to 1°. The rake angle defined by the cutting edge 46 may vary according to the depth of cut and the characteristics of the material being worked. A 35° rake angle may be employed for heavy cuts on hot rolled steel and a 60° rake angle for light cuts. In the present example, progressively sharper cutting angles are utilized at the successive dies 38 to provide for an initial relatively heavy cut and to finish with a light cut at the last die in order to provide for a good surface finish.

The construction of the intermediate cartridge 39' and lowermost cartridge 39" is essentially similar to that of the upper cartridge 39 as described above except insofar as the cartridges are of progressively increased diameter and the associated dies 38 differ in configuration as discussed above. Each such cartridge has a transverse through slot 48 at the underside, below holder 43, for receiving the chips or peeled material 12. The slots 48 are open at each end so that such material easily passes out of the peeler apparatus 11.

Considering now the mechanism which acts to precisely center the stock 13 relative to dies 38 in passage through the peeler, a centering mechanism assembly 49 is situated within each holder 43 below the associated die 38. Each such centering mechanism mechanically exerts a centripetal force on the stock 13 sufficient to counteract any tendency of the stock to deviate from alignment with the axis of the system.

As best shown in FIGURE 3, the centering mechanism 49 is received in a bore within the associated holder 43 of which the upper section 51 is tapered with the smaller diameter end being adjacent the associated die 38. A guide ring 52 is situated within the tapered bore section 51 and has an outer surface which conforms thereto. Ring 52 is formed of a resilient material such as spring steel and has at least one transverse cut 55 therethrough so that the ring is compressible in a radial direction. Accordingly, an upward force exerted against the guide ring 52 compresses the ring by reaction against the tapered bore section 51. Accordingly, the force is converted to an inwardly directed force against the stock 13 which acts to maintain the stock in precise alignment with the axis of the bore 51. The axial force is applied to ring 52 by resilient means acting thereon, specifically by a dished annular resilient spring 53 of the Belleville type in this example. To hold the Belleville spring 53 in position, an externally threaded annular retainer nut 54 is engaged in a threaded lower section 56 of the axial passage through holder 43, the Belleville spring being situated between ring 52 and the retainer nut.

An additional centering mechanism 49' is situated at the lower portion of the lowermost cartridge 39", since during the final portion of the pin movement the work will be engaged in only the lowermost of the above described centering mechanisms 49 and it is desirable that the stock be centered at least at two positions along the length thereof at all times during which cutting is taking place. To receive the additional centering mechanism 49' a bore 57 is provided in the underside of the lowermost cartridge 39" and a supplementary annular holder 58 is secured therein by suitable means such as bolts 59. The additional centering mechanism 49' is disposed within holder 58 and has a guide ring 52', a Belleville spring 53', and retainer nut 54' in an arrangement similar to that previously described.

Owing to the staged shaving of the stock 13 and the fact that high lineal speeds of the work past the cutting edges are not generally necessary for high volume production, cooling and lubricating problems are minimal. It is in fact possible in some instances to operate without coolant or lubrication at feed rates of five to ten feet per minute. At higher rates, typically forty to fifty feet per minute, a simple splash lubrication and cooling means may be desirable. For this purpose, a vertical bore 61 extends within each of the cartridges 39, 39' and 39" and a short transverse passage 62 in one of the cartridges provides for admitting fluid thereto from a suitable supply. Diagonal spray passages 63 extend from bore 61 through the associated cartridge 39 and holder 43 to direct a jet of fluid towards the cutting edge 46 of the associated die 38. In addition to providing for lubricating, cooling, or both, the fluid aids in removing chips from the vicinity of the dies. For clarity of illustration, the several passages 63 are shown in FIGURES 1 and 3 as positioned to direct fluid against the stock 13 at the same angular position thereon. In some instances, it may be desirable to realign the passages 63 to direct fluid towards the stock at different positions around the axis thereof.

In operation, with reference again to FIGURE 1, appropriate lengths of stock 13 are fed into entry guide 21 and positioned thereat to be driven along the axis of the several dies 38 and centering mechanisms 49 by the reciprocating rod 33 of ram 32. In passage through the system, successive increments of the surface material 12 of the stock 13 are peeled away by the successive dies 38. While annular cutting dies 38 of this type do not necessarily exert a centering force on the stock 13 and may in fact tend to move the stock out of alignment with the axis of the system, the centering mechanisms 49 function as hereinbefore described to resist any such tendencies and to hold the stock 13 in the preferred centered relationship throughout the passage of the stock through the peeler.

The action of the centering mechanisms 49 is best illustrated in FIGURE 3 which shows two successive ones of the dies 38 and associated centering mechanisms 49 with the forward end of the stock 13 having been driven through the first die and centering mechanism but not yet having passed into the second die. Thus the inactive position of the centering mechanisms is illustrated in the lower portion of FIGURE 3. Upon entering a centering mechanism 49, the forward end of the stock 13 wedges ring 52 outwardly. This action is facilitated by forming the ring with a beveled surface 64 at the upper inner portion. The wedging of ring 52 in turn reacts against the adjacent tapered surface 51 to compress Belleville spring 53 as shown in the upper portion of FIGURE 3. Spring 53 yieldably resists such movement and, during passage of the stock through the centering mechanism as illustrated in the upper portion of FIGURE 3, continues to exert an upward force on the ring 52. Owing to the tapered surface 51 of the bore in which the ring is disposed, such axial force is translated into a force directed inwardly against the work stock 13 to maintain the stock in the optimum centered relationship to the cutting dies 38.

While the pin peeler apparatus 11 has been described with reference to an embodiment in which the work stock 13 travels vertically through fixed cutting edges, it will be apparent that the invention is readily adaptable to a horizontal work path or to a system in which the stock is stationary and the dies are driven. Similarly, it will be apparent that the invention is applicable to the peeling or shaving of stock other than the solid cylindrical rod material herein discussed for purposes of example. Thus many variations are possible within the scope of the invention and it is not intended to limit the invention except as defined in the following claims.

What is claimed is:

1. Apparatus for shaving a superficial layer of material from short rod-shaped workpieces comprising:
   an annular entrance guide defining a linear path along which said workpieces are traveled,
   a plurality of annular stationary cutting dies of progressively reduced internal diameter disposed along said path, the initial one of said dies being spaced from said entrance guide a distance less than the length of individual ones of said workpieces and successive ones of said dies being spaced from the preceding die by a distance less than said length,
   a plurality of radially contractible stock centering guides for exerting a centripetal force on workpieces passing therethrough, one of said centering guides being disposed at said work path between each adjacent pair of said dies and two of said centering guides being disposed at said path following the final one of said dies, the final one of said two centering guides being spaced from the centering guide which precedes the penultimate one thereof by a distance less than said length of said workpieces, and
   powered means for pushing said workpieces along said path.

2. The combination defined in claim 1 wherein each of said centering guides is comprised of a holder having a tapered passage at said path which is of progressively changing diameter, a radially expansible and contractible guide ring disposed in said tapered passage, a Belleville spring of dished annular configuration bearing against said guide ring, and an annular retainer secured to said holder for compressing said spring against said guide ring.

References Cited
UNITED STATES PATENTS

| | | | |
|---|---|---|---|
| 3,099,929 | 8/1963 | Lindemann | 82—20 |
| 3,132,564 | 5/1964 | Lindemann | 90—24 |
| 3,142,228 | 7/1964 | Lindemann | 90—24 |

FOREIGN PATENTS

| | | |
|---|---|---|
| 725,381 | 9/1942 | Germany. |

ANDREW R. JUHASZ, Primary Examiner

GIL WEIDENFELD, Assistant Examiner

U.S. Cl. X.R.

29—95.1